United States Patent
Ishikawa et al.

(10) Patent No.: US 7,983,514 B2
(45) Date of Patent: Jul. 19, 2011

(54) PHOTONIC BAND GAP ROUTER

(75) Inventors: Muriel Y. Ishikawa, Hillcrest, CA (US);
Edward K. Y. Jung, Bellevue, WA (US);
Clarence T. Tegreene, Bellevue, WA (US)

(73) Assignee: The Invention Science Fund I, LLC

( * ) Notice: Subject to any disclaimer, the term of this patent is extended or adjusted under 35 U.S.C. 154(b) by 0 days.

(21) Appl. No.: 12/798,870

(22) Filed: Apr. 12, 2010

(65) Prior Publication Data

US 2010/0215310 A1 Aug. 26, 2010

Related U.S. Application Data

(63) Continuation of application No. 11/364,499, filed on Feb. 28, 2006, now abandoned, and a continuation-in-part of application No. 11/982,450, filed on Oct. 31, 2007, now abandoned, and a continuation-in-part of application No. 12/387,827, filed on May 6, 2009, now Pat. No. 7,639,900, and a continuation-in-part of application No. 12/590,036, filed on Oct. 30, 2009.

(51) Int. Cl.
*G02F 1/295* (2006.01)
*G02F 6/12* (2006.01)
*G02F 6/26* (2006.01)
*G02F 6/10* (2006.01)
*H04J 14/04* (2006.01)
*H04J 14/00* (2006.01)
*G02B 26/00* (2006.01)

(52) U.S. Cl. ............ 385/4; 385/9; 385/14; 385/15; 385/16; 385/31; 385/129; 385/130; 385/131; 385/132; 398/43; 398/47; 398/49; 398/51; 398/54; 359/290; 359/291

(58) Field of Classification Search ............... 385/4, 9, 385/14–16, 20, 31, 122, 129–132, 141; 398/43, 398/47–49, 51, 54; 359/123, 135, 137, 290, 359/291

See application file for complete search history.

(56) References Cited

U.S. PATENT DOCUMENTS

| | | | |
|---|---|---|---|
| 6,589,334 | B2 | 7/2003 | John et al. |
| 7,489,846 | B2 * | 2/2009 | Grot et al. ............ 385/123 |
| 2003/0123827 | A1 * | 7/2003 | Salerno et al. ........ 385/129 |
| 2005/0053375 | A1 * | 3/2005 | Yoo et al. ............. 398/53 |

OTHER PUBLICATIONS

U.S. Appl. No. 11/364,499, Ishikawa et al.
Bernstein, Greg; Rajagopalan, Bala; Saha, Debanjan; *Optical Network Control: Architecture, Protocols, and Standards;* Pub. Date: Jul. 2003; ISBN 0201753014; Pearson Education.

* cited by examiner

*Primary Examiner* — Brian M. Healy
*Assistant Examiner* — Hung Lam

(57) ABSTRACT

An arrangement includes a photonic band-gap assembly comprising at least one input wave guide and at least one output wave guides, and at least one routing element responsive to signals to selectively route a signal from the input wave guide to one or more of the output wave guides.

34 Claims, 6 Drawing Sheets

PHOTONIC BAND GAP ROUTER

RELATED APPLICATIONS

For purposes of the USPTO extra-statutory requirements, the present application constitutes a continuation of U.S. patent application Ser. No. 11/364,499, entitled PHOTONIC BAND GAP ROUTER, naming Muriel Y. Ishikawa, Edward K. Y. Jung, and Clarence T. Tegreene as inventors, filed on 28 Feb. 2006 now abandoned, or is an application of which a currently co-pending application is entitled to the benefit of the filing date.

For purposes of the USPTO extra-statutory requirements, the present application constitutes a continuation-in-part of U.S. patent application Ser. No. 11/982,450, entitled PHOTONIC BAND GAP ROUTER, naming Muriel Y. Ishikawa, Edward K. Y. Jung, and Clarence. T. Tegreene as inventors, filed 31 Oct. 2007 now abandoned, or is an application of which a currently co-pending application is entitled to the benefit of the filing date.

For purposes of the USPTO extra-statutory requirements, the present application constitutes a continuation-in-part of U.S. patent application Ser. No. 12/387,827, entitled PHOTONIC BAND GAP ROUTER, naming Muriel Y. Ishikawa, Edward K. Y. Jung, and Clarence T. Tegreene as inventors, filed 6 May 2009 now U.S. Pat. No. 7,639,900, or is an application of which a currently co-pending application is entitled to the benefit of the filing date.

For purposes of the USPTO extra-statutory requirements, the present application constitutes a continuation-in-part of U.S. patent application Ser. No. 12/590,036, entitled PHOTONIC BAND. GAP ROUTER, naming Muriel Y. Ishikawa, Edward K. Y. Jung, and Clarence T. Tegreene as inventors, filed 30 Oct. 2009, which is currently co-pending, or is an application of which a currently co-pending application is entitled to the benefit of the filing date.

BACKGROUND

The pace of information exchange continues to grow. More and more demand is placed upon telecommunication infrastructure both within and among organizations, as well as among individuals. There is also a need for enormous information bandwidth within modern computing devices, such as computers, cell phones, and other communication and computing machines. To meet this rising demand, electronic switches and routers have grown increasingly powerful. However, the inherent limitations in electronic switching have motivated the search for primarily optical information exchange solutions.

SUMMARY

The following summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the figures, and from the claims (which follow the detailed description).

In one embodiment, an arrangement includes a photonic band-gap material comprising at least one input wave guide and at least one output wave guides, and at least one routing element responsive to signals to selectively route a signal from the input wave guide to one or more of the output wave guides.

In one embodiment the routing element may comprise a micro-electro-mechanical systems (MEMS) element.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

Figure 1:
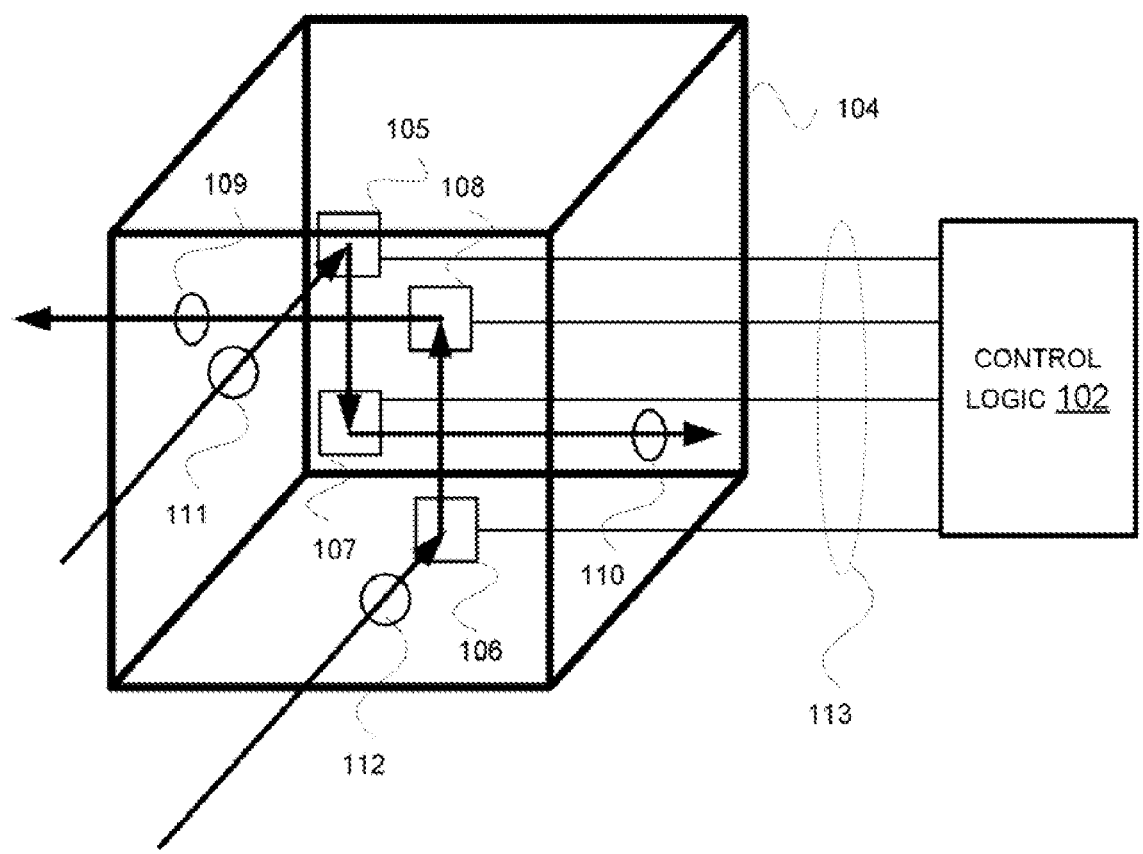
FIG. 1 is an illustration of an embodiment of a photonic band-gap routing arrangement having routing elements with four selectable routing directions.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention. References to "one embodiment" or "an embodiment" do not necessarily refer to the same embodiment, although they may.

FIG. 1 is an illustration of an embodiment of a photonic band-gap routing arrangement having routing elements with four selectable routing directions. The arrangement comprises a photonic band-gap material 104. Generally speaking, photonic band-gap materials have the property of preventing electromagnetic radiation having some discrete wavelength or range of wavelengths (the photonic band gap) from propagating along a given direction in a material. The photonic band-gap material may be characterized by periodicity of dielectric properties in two or three dimensions, and may comprise holes, defects, cavities, or other elements in layers of dielectric materials that give rise to the band-gap behavior.

In one approach, a photonic band-gap material may comprise a periodic dielectric structure, a metallic-dielectric crystal, a semiconductor material, a ceramic material, a magnetic material, an atomic-molecular structure or any other structure configured to produce such effects. The structure is typically formed with one or more of a square lattice structure, a triangular lattice structure, a hexagonal lattice structure, a Kagome structure, a graphite structure, a woodpile structure, an opal structure, an inverse opal structure, or a Bragg stack, to name some of the possibilities. Examples of photonic band-gap materials include one or more of silicon, germanium, gallium arsenide, or indium phosphide. While the structures above refer commonly to crystal lattice materials, other types of structures may be formed as photonic materials. For example, photonic structures have been produced by forming a series of holes in a material. In another alternative, a metamaterial-based photonic material is presented in U.S. Pat. No. 6,589,334 to John, et al, entitled Photonic Bandgap Materials Based on Posts in a Lattice.

In the exemplary embodiment of FIG. 1, a photonic band-gap assembly 104 comprises input apertures 111, 112 and output apertures 109,110. The number of apertures varies and there may be more or fewer apertures than those shown. Moreover, the term aperture is not intended to be limited to direct coupling through a port. For example, in some approaches, such as evanescent coupling, diffractive couplers, energy may be coupled into a crystal, material, or other structure in a variety of manners that would not necessarily be considered to be conventional apertures. One or more electromagnetic signals enter the input apertures 111,112 and, by way of one or more input wave guides, are guided to one or more routing elements 105-108. The photonic band-gap assembly 104 may comprise one or more input waveguides and one or more output wave guides. While the term waveguide is used herein for directness of presentation, in a photonic assembly, the term may be directed toward a variety of structures that preferentially direct or restrict the propagation direction of photons. In many applications, the guiding aspect may be specific to photons corresponding to light of substantially a single wavelength or may be relevant to photons corresponding to light or a range or more than one range of wavelengths.

The wave guides may arise from defect regions in the repeating atomic structure of the band-gap material. The wave guides may include regions comprising material having a substantially different dielectric property than surrounding material. The wave guides may include surface and/or interior regions of the photonic band-gap assembly.

The routing elements 105-108, responsive to communication 113 from the control logic 102, route the electromagnetic signals to one or more of the output apertures 109,110, to other routing elements, or to other desired locations. In the embodiment of FIG. 1, the routing elements 105-108, responsive to control signals 113, may route electromagnetic signals in four possible selectable routing directions.

The photonic band-gap assembly comprises at least one routing element 105-108 responsive to signals to selectively route a signal from the input wave guide to one or more of the plurality of output wave guides. A routing element 105-108 may include a photoresponsive, photorefractive and/or photoabsorptive material. A routing element 105-108 may include a compound or alloy formed from elements in columns III and V of the periodic table, one or more electronically, magnetically or mechanically movable elements, and/or material having a reflectivity and-or refraction index that varies according to at least one of an applied electrical, optical, magnetic, mechanical, acoustic, or other index affecting influence. A routing element 105-108 may include a micro-electro-mechanical systems (MEMS) element.

A MEMS element may include an electrically actuated MEMS circuit having at least one dimension on the order of one or a few microns. An electrically actuated MEMS circuit may include an electrically responsive actuator to displace at least one of lattice points or impurities to affect a geometry of at least one of the wave guides. The electrically responsive actuator may include a piezo-electric crystal. The MEMS element may include lattice points of at least one of the wave guides.

Alternatively, other types of MEMS elements or non-MEMS elements may be appropriate, depending upon the application or configuration. In some applications, for example, the MEMS element may be magnetically or electrostatically driven. In another approach, the routing element 105-108 may include a material whose properties are controllable. In one example, the routing element 105-108 may include portion formed from a material having a dielectric constant, index of refraction, or dimension that is a function of an applied electric or magnetic field. Such materials may include electrooptic materials, magnetostrictive materials, electroactive polymers, or other types of materials. The portion may affect the waveguide properties directly or indirectly. For example, the portion may affect the actual dimension of the waveguide by forming a portion of the waveguide wall or by applying a force to a material forming a portion of the waveguide Wall.

Figure 2:
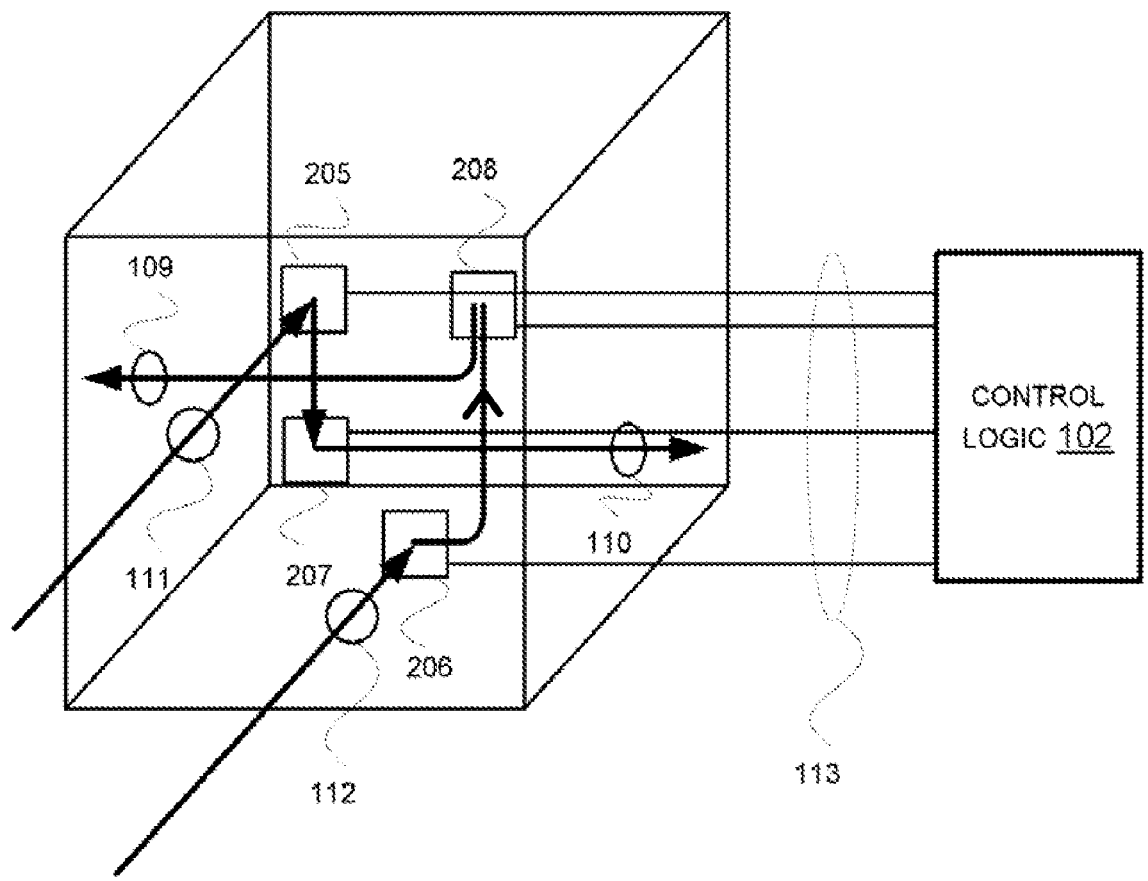
FIG. 2 is an illustration of an embodiment of a photonic band-gap routing arrangement having routing elements with two selectable routing directions.

FIG. 2 is an illustration of an embodiment of a photonic band-gap routing arrangement having routing elements with two selectable routing directions. The routing elements 205-208 respond to control signals 113 to route electromagnetic signals in two selectable directions. In this case the routing element 205-208 routing directions are down or to the right, although the selectable directions may vary in number and direction in other embodiments.

To provide full routing for the electromagnetic signals in all directions, curved wave guides are provided. The combination of the routing elements 205-208 moving signals only to the right or down, and curved (and possibly also straight) output wave guides provides for full routing of the electromagnetic signals. For example, a signal entering aperture 111 is guided by an input wave guide to routing element 205, where, responsive to signals from the control logic 102, the signal is routed down to routing element 207. From there it is routed to the right, traversing an output wave guide to exit aperture 110.

A signal entering aperture 112 is guided to routing element 206, which routes the signal into an output (what may also be referred to as an intermediate) waveguide with a ninety degree upward bend. Consequently, the signal arrives at routing element 208, which routes the signal to another wave guide having a ninety degree bend. As a result, the signal exits via aperture 109. Thus, a signal entering the arrangement may be effectively routed up and to the left, whereas another signal using the same routing elements may be routed to the right and down.

Thus, the photonic band-gap assembly may comprise straight and/or bent waveguides, with the bent waveguides sometimes including one or more configured to produce a substantially ninety degree turn (or more) in the direction of a signal. In some approaches, the waveguide may have a gradual bend or may include an internal structure designed to direct the photons at a relatively abrupt angle. An example of an abrupt angle may be a 90 degree turn.

Band-gap routing arrangements may include at least one routing element such as 205-208 which includes a first set of routing elements having a first set of routing directions, and a second set of routing elements having a second set of routing directions, the second set of routing directions substantially orthogonal to the first set of routing directions.

Figure 3:
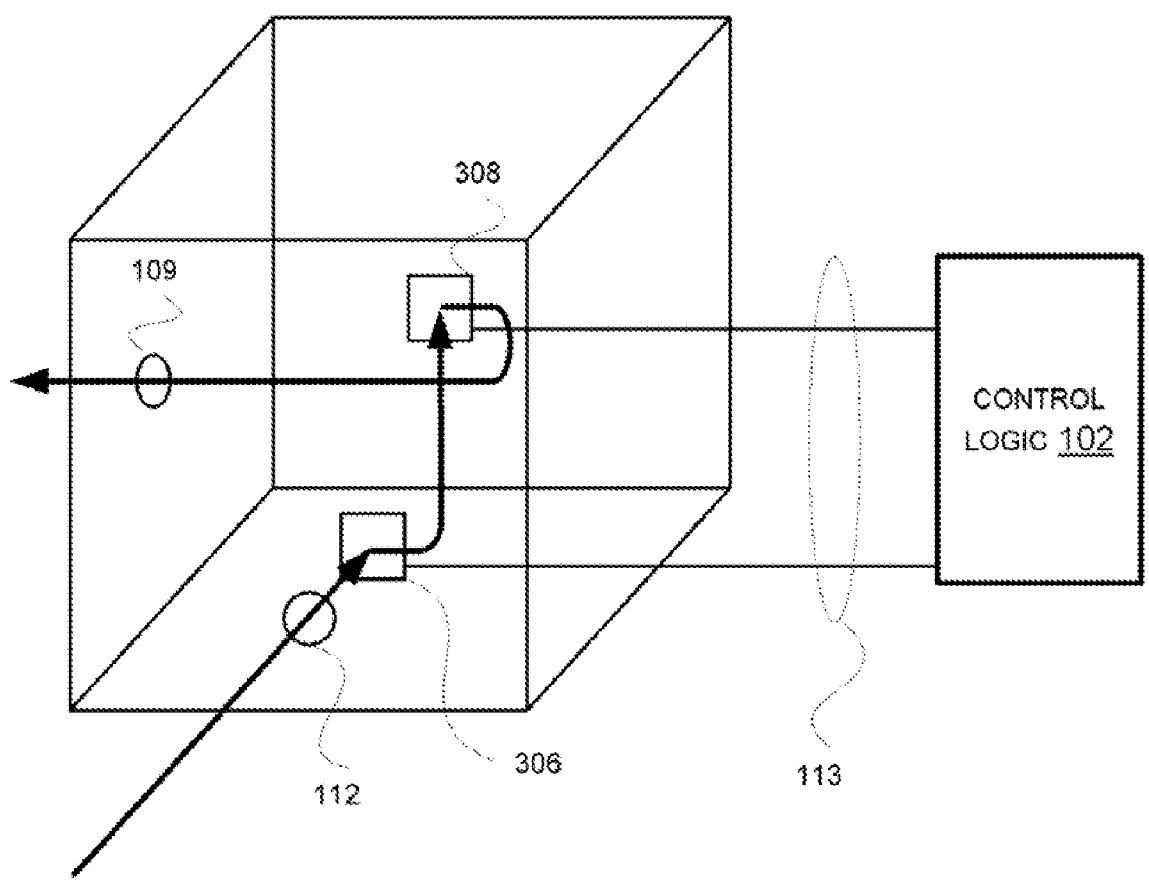
FIG. 3 is an illustration of an embodiment of a photonic band-gap routing arrangement having routing elements with a single selectable routing direction.

FIG. 3 is an illustration of an embodiment of a photonic band-gap routing arrangement having routing elements with a single selectable routing direction. A signal entering aperture 112 is guided to routing element 306, which in this example can route only to the right. However, because it is desired to route the signal upwards, the control logic 102 causes the signal to be routed right-wards to a wave guide comprising an upward bend. Consequently, the signal arrives at routing element 308, which, in this example, can also route only to the right. Because it is desired to route the signal to the left, the signal is routed to a wave guide having a one-hundred eighty degree bend. Consequently, the signal exits via aperture 109.

Thus, one or more of the output wave guides of a band-gap routing arrangement may be adapted to produce a substantially one hundred eighty degree turn in the direction of a signal. In some embodiments, one or more of the output wave guides may be adapted to produce a substantially two hundred seventy degree turn in the direction of a signal. Also, the turns are not confined to a single plane in all embodiments. It may be desirable in many applications to direct photons into or out of plane to provide greater design flexibility. In such embodiments, the design flexibility can allow directing photons along paths in substantially any direction, including vertical, horizontal, combinations thereof, and/or reflections back along the path of arrival.

Band-gap routing arrangements may include at least one routing element such as 306-308 which includes four sets of routing elements, each set having a routing direction different than the others.

Figure 4:
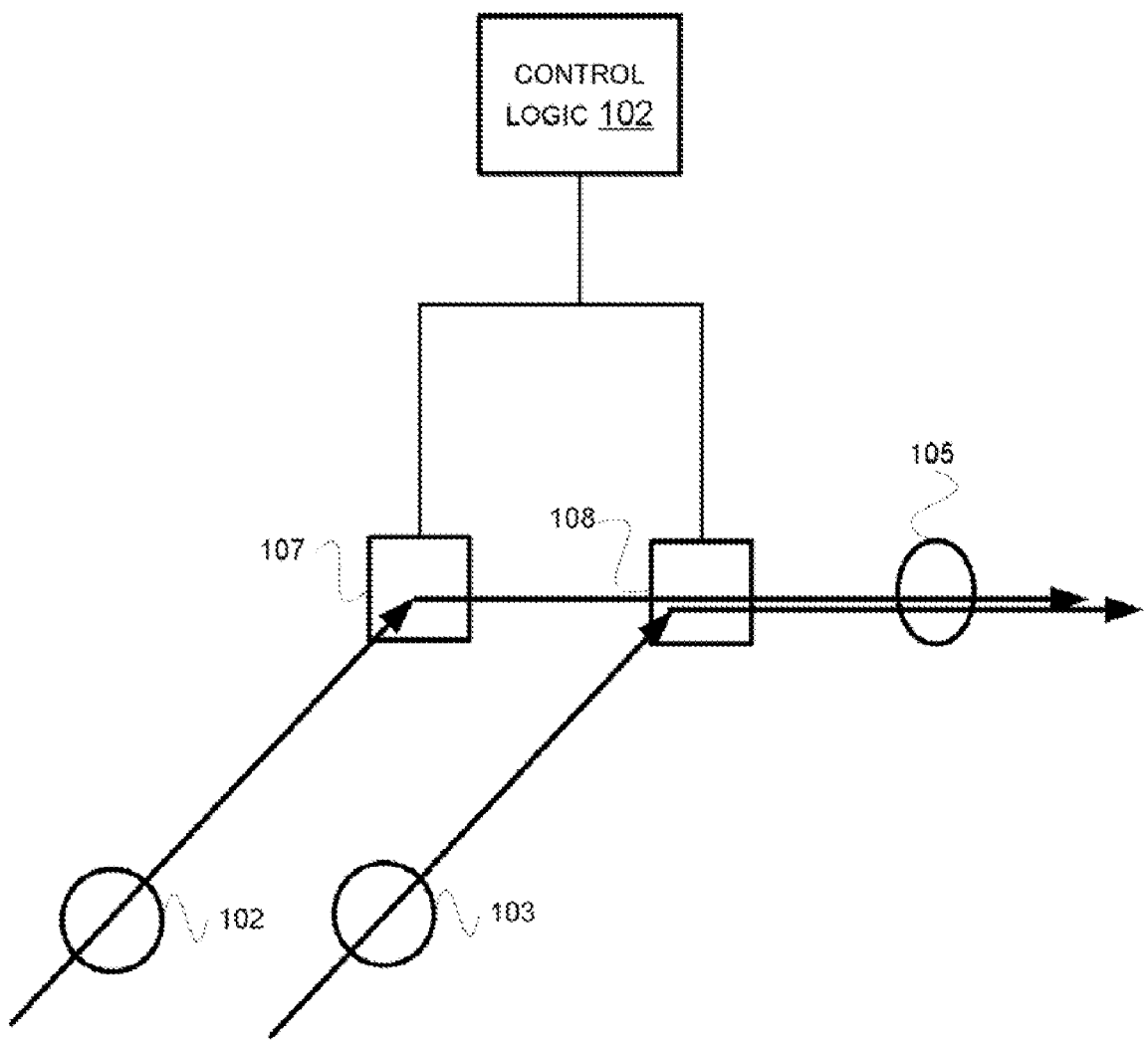
FIG. 4 is an illustration of an embodiment of a photonic band-gap routing arrangement for time division multiplexing and/or wave division multiplexing.

FIG. 4 is an illustration of an embodiment of a photonic band-gap routing arrangement for time division multiplexing and/or wave division multiplexing. An electromagnetic signal enters the band-gap routing arrangement through aperture 102 and encounters routing element 107, which directs the signal to aperture 105. An electromagnetic signal enters the band-gap routing arrangement through aperture 103 and encounters routing element 108, upon which it is directed to aperture 105. The control logic (memory instructions, data, and/or circuits to define control signals for a process) influences the at least one routing elements 107-108 to selectively route signals from different input wave guides to a same output wave guide during different time intervals. The routing may be done periodically, asynchronously, or according to another appropriate protocol.

In the figure, the two input signals are initially routed by two different routing elements 107-108, but the control logic may also influence one routing element such as 107 or 108 to selectively and concurrently route a plurality of input signals on different input wave guides to the same output wave guide.

Figure 5:
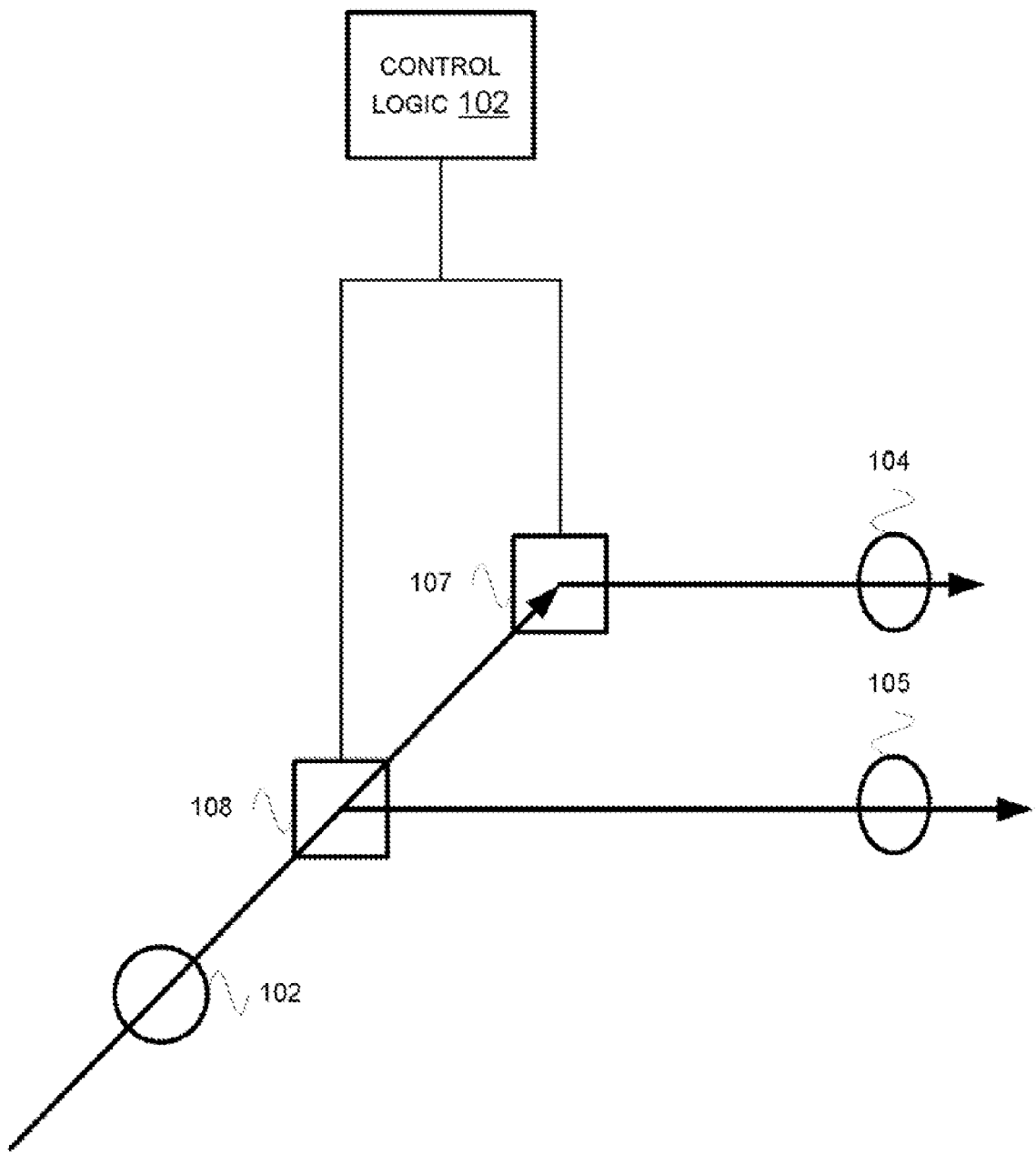
FIG. 5 is an illustration of an embodiment of a photonic band-gap routing arrangement for wave de-multiplexing.

FIG. 5 is an illustration of an embodiment of a photonic band-gap routing arrangement for wavelength de-multiplexing. At least one of the routing elements 107,108 is adapted to deflect certain radiation wavelengths and to transmit others. (Routing element 108 is so adapted in the figure). Alternatively or additionally, a first waveguide such as 107 or 108 may be adapted to transmit a plurality of wavelengths, with the first waveguide abutted to a second waveguide adapted to transmit a subset of the plurality of wavelengths and to block transmission of at least one of the plurality of wavelengths.

In a similar fashion, the routing elements of FIG. 5 can be activated selectively to direct photons of one or more wavelength along selected paths on a time division basis. Such activation can produce time division demultiplexing using protocols similar to those used in other systems that use switching to demultiplex.

Figure 6:
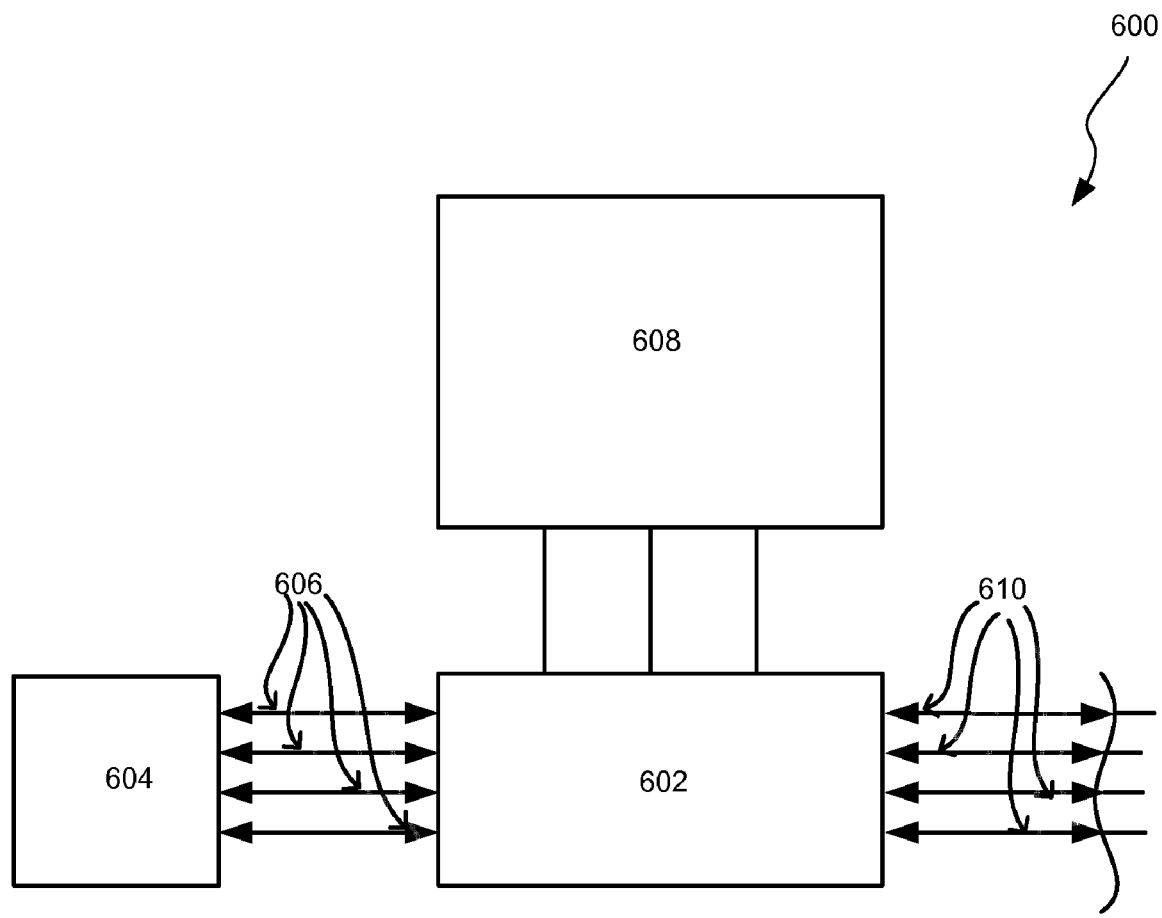
FIG. 6 is a diagrammatic representation of a communication system incorporating a photonic bandgap router.

FIG. 6 shows a communication system 600 incorporating a photonic bandgap router 602. The photonic bandgap router 602 may be any one of the previously described routers, or a router incorporating features of any of them. An optical system 604, which may be a fiber optic network, local network, or other system in which optical signals are routed, provides one or more input signals to one or more input ports 606 of the router 600. A control system 608 provides control signals to the photonic router to selectively control the transfer of signals from the input ports 606 to one or more output ports 610.

In one approach, the control system 608 may be a time based control system that implements a time division multiplexing or demultiplexing protocol. In another approach, the control system may activate the router to produce wavelength division multiplexing or demultiplexing. In still other approaches, the control system 608 can direct signals, which may include selectively directed packets, according to other network control algorithms, or a combination of such algorithmic controls with multiplexing or demultiplexing. For example, in one approach, the control system 608 selectively controls routing of packets of information according to known routing techniques, such as are described in Bernstein, et al, *Optical Network Control: Architecture, Protocols, and Standards*, ISBN: 0201753014 (2003), which is incorporated herein by reference. Moreover, routing may be directed globally or may be directed according to individual packet addressing approaches, such as IP addressing approaches.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein, including the control system 608 may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular aspects of the present subject matter described herein have been shown and described, it will be obvious to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should NOT be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" and/or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense of one having skill in the art would understand the convention (e.g., "a system having at least one of A, B, and C" would include but not be limited to systems that have A alone, B alone, C alone, A and B together, A and C together, B and C together, and/or A, B, and C together). In those instances where a convention analogous to "at least one of A, B, or C, etc." is used, in general such a construction is intended in the sense of one having skill in the art would understand the convention (e.g., "a system having at least one of A, B, or C" would include but not be limited to systems that have A alone, B alone, C alone, A and B together, A and C together, B and C together, and/or A, B, and C together).

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An arrangement comprising:
   a photonic band-gap assembly comprising an array of lattice points forming at least one input wave guide and at least one output wave guide; and
   the photonic band-gap assembly including at least one mechanically movable element operably connected to at least one lattice point in the array of lattice points, the at least one mechanically movable element being responsive to signals to displace the at least one lattice point to affect a geometry of at least one of the at least one input wave guide and at least one output wave guide and to selectively route a signal from the input wave guide to one or more of the output wave guides.

2. The arrangement of claim 1, wherein the at least one input wave guide is an optical wave guide.

3. The arrangement of claim 1 wherein the photonic band-gap assembly includes at least one photonic bandgap configured to prohibit propagation of photons along at least one direction.

4. The arrangement of claim 1, wherein the at least one output waveguide includes:
   one or more waveguides shaped to produce a substantially ninety degree turn in the direction of a signal.

5. The arrangement of claim 1, wherein the photonic band-gap assembly further comprises:
   a periodic dielectric structure.

6. The arrangement of claim 1, wherein the photonic band-gap assembly further comprises:
   an atomic-molecular structure comprising at least one of a square lattice structure, a triangular lattice structure, a hexagonal lattice structure, a Kagome structure, a graphite structure, a woodpile structure, an opal structure, an inverse opal structure, or a Bragg stack.

7. The arrangement of claim 1, wherein the photonic band-gap assembly further comprises:
   a metallic-dielectric crystal.

8. The arrangement of claim 1, wherein the photonic band-gap assembly further comprises:
   a semiconductor material.

9. The arrangement of claim 1, wherein the photonic band-gap assembly further comprises:
   a ceramic material.

10. The arrangement of claim 1, wherein the input wave guide and output wave guides comprise:
    regions comprising material having a substantially different dielectric property than surrounding material.

11. The arrangement of claim 1, wherein the input wave guide and a plurality of output waveguides further comprise:
    surface regions of the photonic band-gap assembly.

12. The arrangement of claim 1, wherein the input wave guide and a plurality of output wave guides further comprise:
    interior regions of the photonic band gap assembly.

13. The arrangement of claim 1, wherein the mechanically movable element includes:
    a micro-electro-mechanical systems (MEMS) element.

14. The arrangement of claim 13, wherein the micro-electro-mechanical systems (MEMS) element further comprises:
    an electrically actuated MEMS circuit having at least one submicron dimension.

15. The arrangement of claim 1, wherein the output wave guides further comprise:
    one or more wave guides adapted to produce a substantially one hundred eighty degree turn in the direction of a signal.

16. The arrangement of claim 1, wherein the output wave guides further comprise:
    one or more wave guides adapted to produce a substantially two hundred seventy degree turn in the direction of a signal.

17. The arrangement of claim 1, wherein the photonic band-gap assembly further comprises:
    at least one of silicon, germanium, gallium arsenide, or indium phosphide.

18. The arrangement of claim 1, further comprising:
    logic to influence the at least one mechanically movable element to selectively and periodically route signals from different input wave guides to a same output wave guide during different time intervals.

19. The arrangement of claim 1, further comprising:
    logic to influence the at least one mechanically movable element to selectively and concurrently route a plurality of input signals on different input wave guides to a same output wave guide.

20. The arrangement of claim 1, wherein the at least one output wave guide is an optical wave guide.

21. A method comprising:
    directing a signal from an input wave guide to an output wave guide, wherein the input wave guide and output wave guide are defined by an array of lattice points in a photonic band gap assembly, by displacing at least one lattice point in the array of lattice points, wherein displacing at least one lattice point in the array of lattice points affects a geometry of at least one of the input wave guide and the output wave guide.

22. The method of claim 21 wherein displacing at least one lattice point in the array of lattice points includes causing at least a ninety degree turn in a direction of propagation of the input signal.

23. The method of claim 21, wherein displacing at least one lattice point in the array of lattice points includes causing a substantially one hundred eighty degree turn in a direction of propagation of the input signal.

24. The method of claim 21, wherein displacing at least one lattice point in the array of lattice points includes causing a substantially two hundred seventy degree turn in a direction of propagation of the input signal.

25. A photonic routing system, comprising:
    a photonic band gap assembly including an array of lattice points, the array of lattice points forming at least one input port and a plurality of output ports; and
    the photonic band gap assembly including a mechanically movable element integral to the photonic band gap assembly and responsive to control signals to switch between at least two configurations, a first of the configurations having a first lattice distribution and being operative to direct photon signals received at the at least one input port to a first of the output ports and a second of the configurations having a second lattice distribution different from the first lattice distribution and being operative to direct photon signals received at the at least one input port to a second of the output ports.

26. The photonic routing system of claim 25 wherein the mechanically movable element is a MEMS element.

27. The photonic routing system of claim 25 wherein the mechanically movable element in the first configuration directs photon signals along a first path and in the second configuration directs photon signals along a second path different from the first path.

28. The photonic routing system of claim 25 further including control circuitry responsive to commands to provide the control signals to the mechanically movable element.

29. The arrangement of claim 1 wherein the at least one mechanically movable element is responsive to signals to affect a geometry of at least one of the at least one input wave guide and at least one output wave guide by changing a dimension of at least one of the at least one input wave guide and at least one output wave guide.

30. The arrangement of claim 1 wherein the at least one mechanically movable element is responsive to signals to affect a geometry of at least one of the at least one input wave guide and at least one output wave guide by displacing the at least one lattice point relative to other lattice points in the array of lattice points.

31. The method of claim 21 wherein displacing at least one lattice point in the array of lattice points affects a geometry of at least one of the input wave guide and the output wave guide by changing a dimension of at least one of the input wave guide and the output wave guide.

32. The method of claim 21 wherein displacing at least one lattice point in the array of lattice points affects a geometry of at least one of the input wave guide and the output wave guide by displacing the at least one lattice point relative to other lattice points in the array of lattice points.

33. The photonic routing system of claim 25 wherein the array of lattice points forms at least one input guide and a plurality of output guides, wherein the at least one input guide includes the at least one input port and wherein the plurality of output guides include the plurality of output ports.

34. The photonic routing system of claim 25 wherein the first lattice distribution has a first band-gap distribution and wherein the second lattice distribution has a second band-gap distribution different from the first band-gap distribution.

* * * * *